United States Patent
Long et al.

(10) Patent No.: US 8,996,528 B1
(45) Date of Patent: *Mar. 31, 2015

(54) SYSTEM AND METHOD FOR PROBABILISTIC RELATIONAL CLUSTERING

(71) Applicant: The Research Foundation for The State University of New York, Binghamton, NY (US)

(72) Inventors: Bo Long, Palo Alto, CA (US); Zhongfei Mark Zhang, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,939

(22) Filed: Mar. 18, 2014

Related U.S. Application Data

(63) Continuation of application No. 13/628,559, filed on Sep. 27, 2012, now Pat. No. 8,676,805, which is a continuation of application No. 12/538,835, filed on Aug. 10, 2009, now Pat. No. 8,285,719.

(60) Provisional application No. 61/087,168, filed on Aug. 8, 2008.

(51) Int. Cl.
*G06F 7/00* (2006.01)
*G06F 17/30* (2006.01)

(52) U.S. Cl.
CPC ................................ *G06F 17/30598* (2013.01)
USPC ............ 707/737; 707/748; 707/754; 707/758

(58) Field of Classification Search
None
See application file for complete search history.

(56) References Cited

U.S. PATENT DOCUMENTS

| | | | | |
|---|---|---|---|---|
| 7,730,063 | B2 * | 6/2010 | Eder | 707/736 |
| 7,849,097 | B2 * | 12/2010 | Cao et al. | 707/776 |
| 7,853,485 | B2 * | 12/2010 | Song et al. | 705/26.1 |
| 8,407,230 | B2 * | 3/2013 | Slaney et al. | 707/748 |
| 2002/0099594 | A1 * | 7/2002 | Heard | 705/10 |
| 2003/0232314 | A1 * | 12/2003 | Stout et al. | 434/322 |
| 2005/0261953 | A1 * | 11/2005 | Malek et al. | 705/10 |
| 2006/0040247 | A1 * | 2/2006 | Templin | 434/362 |
| 2008/0168061 | A1 * | 7/2008 | Liu et al. | 707/7 |
| 2008/0294686 | A1 * | 11/2008 | Long et al. | 707/103 R |
| 2010/0153318 | A1 * | 6/2010 | Branavan et al. | 706/12 |

* cited by examiner

*Primary Examiner* — Hexing Liu
(74) *Attorney, Agent, or Firm* — Steven M. Hoffberg; Ostrolenk Faber LLP

(57) ABSTRACT

Relational clustering has attracted more and more attention due to its phenomenal impact in various important applications which involve multi-type interrelated data objects, such as Web mining, search marketing, bioinformatics, citation analysis, and epidemiology. A probabilistic model is presented for relational clustering, which also provides a principal framework to unify various important clustering tasks including traditional attributes-based clustering, semi-supervised clustering, co-clustering and graph clustering. The model seeks to identify cluster structures for each type of data objects and interaction patterns between different types of objects. Under this model, parametric hard and soft relational clustering algorithms are provided under a large number of exponential family distributions. The algorithms are applicable to relational data of various structures and at the same time unify a number of state-of-the-art clustering algorithms: co-clustering algorithms, the k-partite graph clustering, and semi-supervised clustering based on hidden Markov random fields.

20 Claims, 2 Drawing Sheets

Examples of the structures of relational data.

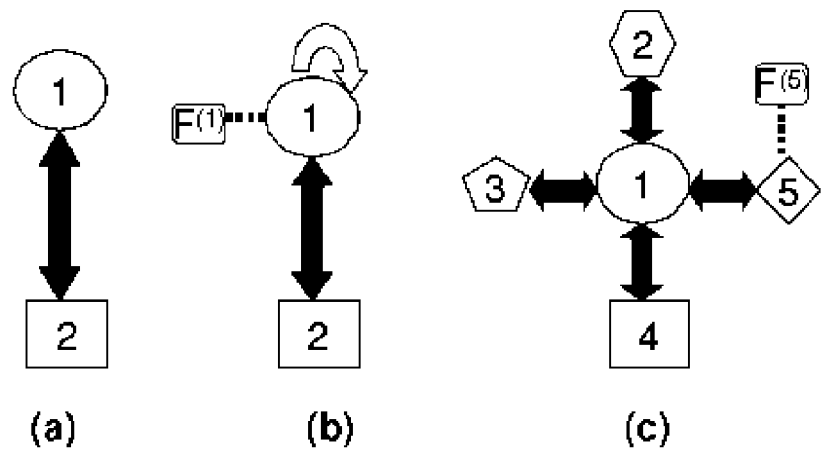
Figure 1: Examples of the structures of relational data.
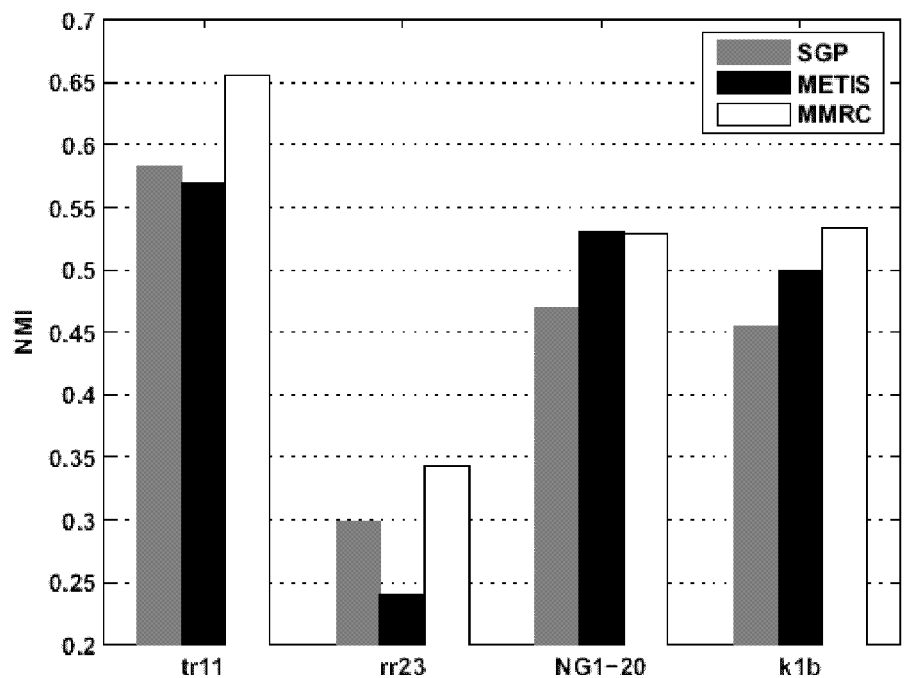
Figure 2: NMI comparison of SGP, METIS and MMRC algorithms.

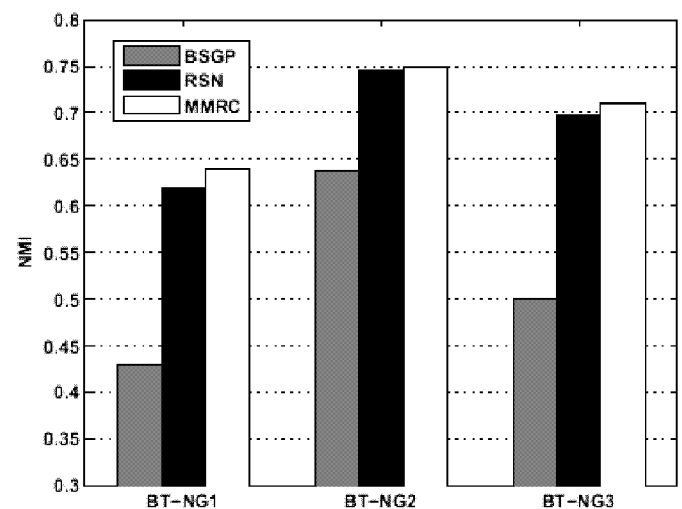
Figure 3: NMI comparison of BSGP, RSN and MMRC algorithms for bi-type data.
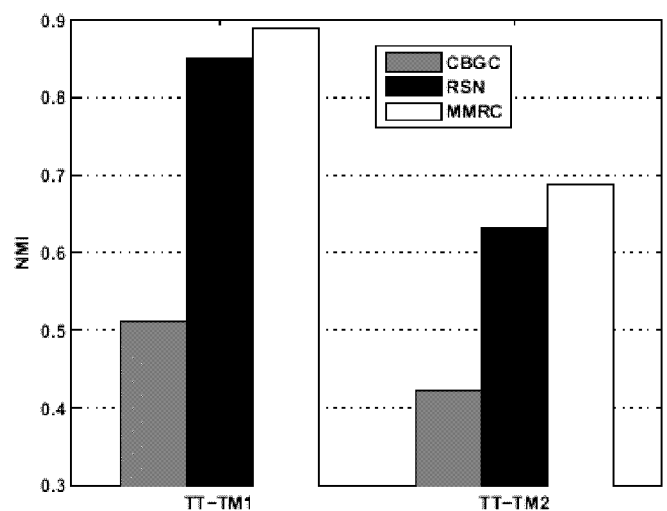
Figure 4: NMI comparison of CBGC, RSN and MMRC algorithms for tri-type data.

SYSTEM AND METHOD FOR PROBABILISTIC RELATIONAL CLUSTERING

CROSS REFERENCE TO RELATED APPLICATIONS

The present application is a Continuation of U.S. patent application Ser. No. 13/628,559, filed Sep. 27, 2012, now U.S. Pat. No. 8,676,805, issued Mar. 18, 2014, which is a Continuation of U.S. patent application Ser. No. 12/538,835, filed Aug. 10, 2009, now U.S. Pat. No. 8,285,719, issued Oct. 9, 2012, which claims benefit of priority from U.S. Provisional Patent Application Ser. No. 61/087,168, filed Aug. 8, 2008, the entirety of which is expressly incorporated herein by reference.

GOVERNMENT RIGHTS CLAUSE

This invention was made with government support under IIS-0535162 awarded by The National Science Foundation and award FA8750-05-2-0284 awarded by AFRL and award FA9550-06-1-0327 awarded by AFOSR. The government has certain rights in the invention.

BACKGROUND OF THE INVENTION

1. Introduction

Most clustering approaches in the literature focus on "flat" data in which each data object is represented as a fixed-length attribute vector [38]. However, many real-world data sets are much richer in structure, involving objects of multiple types that are related to each other, such as documents and words in a text corpus, Web pages, search queries and Web users in a Web search system, and shops, customers, suppliers, shareholders and advertisement media in a marketing system.

In general, relational data contain three types of information, attributes for individual objects, homogeneous relations between objects of the same type, heterogeneous relations between objects of different types. For example, for a scientific publication relational data set of papers and authors, the personal information such as affiliation for authors are attributes; the citation relations among papers are homogeneous relations; the authorship relations between papers and authors are heterogeneous relations. Such data violate the classic independently and identically distributed (IID) assumption in machine learning and statistics and present huge challenges to traditional clustering approaches. An intuitive solution is that we transform relational data into flat data and then cluster each type of objects independently. However, this may not work well due to the following reasons.

First, the transformation causes the loss of relation and structure information [14]. Second, traditional clustering approaches are unable to tackle influence propagation in clustering relational data, i.e., the hidden patterns of different types of objects could affect each other both directly and indirectly (pass along relation chains). Third, in some data mining applications, users are not only interested in the hidden structure for each type of objects, but also interaction patterns involving multi-types of objects. For example, in document clustering, in addition to document clusters and word clusters, the relationship between document clusters and word clusters is also useful information. It is difficult to discover such interaction patterns by clustering each type of objects individually.

Moreover, a number of important clustering problems, which have been of intensive interest in the literature, can be viewed as special cases of relational clustering. For example, graph clustering (partitioning) [7, 42, 13, 6, 20, 28] can be viewed as clustering on singly-type relational data consisting of only homogeneous relations (represented as a graph affinity matrix); co-clustering [12, 2] which arises in important applications such as document clustering and micro-array data clustering, can be formulated as clustering on bi-type relational data consisting of only heterogeneous relations. Recently, semi-supervised clustering [46, 4] has attracted significant attention, which is a special type of clustering using both labeled and unlabeled data. Therefore, relational data present not only huge challenges to traditional unsupervised clustering approaches, but also great need for theoretical unification of various clustering tasks.

2. Related Work

Clustering on a special case of relational data, bi-type relational data consisting of only heterogeneous relations, such as the word-document data, is called co-clustering or bi-clustering. Several previous efforts related to co-clustering are model based [22, 23]. Spectral graph partitioning has also been applied to bi-type relational data [11, 25]. These algorithms formulate the data matrix as a bipartite graph and seek to find the optimal normalized cut for the graph.

Due to the nature of a bipartite graph, these algorithms have the restriction that the clusters from different types of objects must have one-to-one associations. Information-theory based co-clustering has also attracted attention in the literature. [12] proposes a co-clustering algorithm to maximize the mutual information between the clustered random variables subject to the constraints on the number of row and column clusters. A more generalized co-clustering framework is presented by [2] wherein any Bregman divergence can be used in the objective function. Recently, co-clustering has been addressed based on matrix factorization. [35] proposes an EM-like algorithm based on multiplicative updating rules.

Graph clustering (partitioning) clusters homogeneous data objects based on pairwise similarities, which can be viewed as homogeneous relations. Graph partitioning has been studied for decades and a number of different approaches, such as spectral approaches [7, 42, 13] and multilevel approaches [6, 20, 28], have been proposed. Some efforts [17, 43, 21, 21, 1] based on stochastic block modeling also focus on homogeneous relations. Compared with co-clustering and homogeneous-relation-based clustering, clustering on general relational data, which may consist of more than two types of data objects with various structures, has not been well studied in the literature. Several noticeable efforts are discussed as follows. [45, 19] extend the probabilistic relational model to the clustering scenario by introducing latent variables into the model; these models focus on using attribute information for clustering. [18] formulates star-structured relational data as a star-structured m-partite graph and develops an algorithm based on semi-definite programming to partition the graph. [34] formulates multi-type relational data as K-partite graphs and proposes a family of algorithms to identify the hidden structures of a k-partite graph by constructing a relation summary network to approximate the original k-partite graph under a broad range of distortion measures.

The above graph-based algorithms do not consider attribute information. Some efforts on relational clustering are based on inductive logic programming [37, 24, 31]. Based on the idea of mutual reinforcement clustering, [51] proposes a framework for clustering heterogeneous Web objects and [47] presents an approach to improve the cluster quality of interrelated data objects through an iterative reinforcement clustering process. There are no sound objective function and theoretical proof on the effectiveness and correctness (convergence) of the mutual reinforcement clustering. Some efforts [26, 50, 49, 5] in the literature focus on how to measure the similarities or choosing cross-relational attributes.

To summarize, the research on relational data clustering has attracted substantial attention, especially in the special cases of relational data. However, there is still limited and preliminary work on general relational data clustering.

BRIEF DESCRIPTION OF THE DRAWINGS

FIGS. 1A-1C shows examples of the structures of relational data;

FIG. 2 shows an NMI comparison of SGP, METIS and MMRC algorithms;

FIG. 3 shows an NMI comparison of BSGP, RSN and MMRC algorithms for bi-type data; and FIG. 4 shows an NMI comparison of CBGC, RSN and MMRC algorithms for tri-type data.

SUMMARY OF THE INVENTION

Most clustering approaches in the literature focus on "flat" data in which each data object is represented as a fixed-length attribute vector. However, many real-world data sets are much richer in structure, involving objects of multiple types that are related to each other, such as documents and words in a text corpus, Web pages, search queries and Web users in a Web search system, and shops, customers, suppliers, share holders and advertisement media in a marketing system.

In general, relational data contain three types of information, attributes for individual objects, homogeneous relations between objects of the same type, heterogeneous relations between objects of different types. For example, for a scientific publication, relational data sets of papers and authors, the personal information such as affiliation for authors are attributes; the citation relations among papers are homogeneous relations; the authorship relations between papers and authors are heterogeneous relations. Such data violate the classic IID assumption in machine learning and statistics, and present significant challenges to traditional clustering approaches. An intuitive solution is that relational data is transformed into flat data and then each type of object clustered independently. However, this may not work well due to the following reasons. First, the transformation causes the loss of relation and structure information. Second, traditional clustering approaches are unable to tackle influence propagation in clustering relational data, i.e., the hidden patterns of different types of objects could affect each other both directly and indirectly (pass along relation chains). Third, in some data mining applications, users are not only interested in the hidden structure for each type of objects, but also interaction patterns involving multi-types of objects. For example, in document clustering, in addition to document clusters and word clusters, the relationship between document clusters and word clusters is also useful information. It is difficult to discover such interaction patterns by clustering each type of objects individually.

Moreover, a number of important clustering problems, which have been of intensive interest in the literature, can be viewed as special cases of relational clustering. For example, graph clustering (partitioning) can be viewed as clustering on singly-type relational data consisting of only homogeneous relations (represented as a graph affinity matrix); co-clustering which arises in important applications such as document clustering and micro-array data clustering, can be formulated as clustering on bi-type relational data consisting of only heterogeneous relations.

Recently, semi-supervised clustering has attracted significant attention, which is a special type of clustering using both labeled and unlabeled data. It can be formulated as clustering on single-type relational data consisting of attributes and homogeneous relations.

The present system and method is based on a probabilistic model for relational clustering, which also provides a principal framework to unify various important clustering tasks including traditional attributes-based clustering, semi-supervised clustering, co-clustering and graph clustering. The model seeks to identify cluster structures for each type of data objects and interaction patterns between different types of objects. It is applicable to relational data of various structures. Under this model, parametric hard and soft (and hybrid) relational clustering algorithms are presented under a large number of exponential family distributions.

There are three main advantages: (1) the technique is applicable to various relational data from various applications; (2) It is capable of adapting different distribution assumptions for different relational data with different statistical properties; and (3) The resulting parameter matrices provide an intuitive summary for the hidden structure for the relational data.

3. Model Formulation

A probabilistic model is herein proposed for relational clustering, which also provides a principal framework to unify various important clustering tasks including traditional attributes-based clustering, semi-supervised clustering, co-clustering and graph clustering. The proposed model seeks to identify cluster structures for each type of data objects and interaction patterns between different types of objects. It is applicable to relational data of various structures. Under this model, parametric hard and soft relational clustering algorithms are provided under a large number of exponential family distributions. The algorithms are applicable to various relational data from various applications and at the same time unify a number of state-of-the-art clustering algorithms: co-clustering algorithms, the k-partite graph clustering, Bregman k-means, and semi-supervised clustering based on hidden Markov random fields.

With different compositions of three types of information, attributes, homogeneous relations and heterogeneous relations, relational data could have very different structures. FIGS. 1A-1C show three examples of the structures of relational data. FIG. 1A refers to a simple bi-type of relational data with only heterogeneous relations such as word-document data. FIG. 1B represents a bi-type data with all types of information, such as actor-movie data, in which actors (type 1) have attributes such as gender; actors are related to each other by collaboration in movies (homogeneous relations); actors are related to movies (type 2) by taking roles in movies (heterogeneous relations). FIG. 1C represents the data consisting of companies, customers, suppliers, share-holders and advertisement media, in which customers (type 5) have attributes.

A relational data set as a set of matrices is reprsented. Assume that a relational data set has m different types of data objects, $\chi^{(1)} = \{x_i^{(1)}\}_{i=1}^{n_1}, \ldots, \chi^{(m)} = \{x_i^{(m)}\}_{i=1}^{n_m}$, where $n_j$ denotes the number of objects of the jth type and $x_p^{(j)}$ denotes the name of the $p^{th}$ object of the $j^{th}$ type. The observations of the relational data are represented as three sets of matrices, attribute matrices $\{F^{(j)} \in \mathbb{R}^{d_j \times n_j}\}_{j=1}^m$, where $d_j$ denotes the dimension of attributes for the $j^{th}$ type objects and $F_p^{(j)}$ denotes the attribute vector for object $x_p^{(j)}$; homogeneous relation matrices $\{S^{(j)} \in \mathbb{R}^{n_j \times n_j}\}_{j=1}^m$, where $S_{pq}^{(j)}$ denotes the relation between $x_p^{(j)}$ and $x_q^{(j)}$; heterogeneous relation matrices $\{R^{(ij)} \in \mathbb{R}^{n_i \times n_j}\}_{i,j=1}^m$, where $R_{pq}^{(ij)}$ denotes the relation between $x_p^{(i)}$ and $x_q^{(j)}$. The above representation is a general formulation. In real applications, not every type of object has attributes, homogeneous relations and heterogeneous relations. For example, the relational data set in FIG. 1A is represented by only one heterogeneous matrix $R^{(12)}$, and the one in FIG. 1B is represented by three matrices, $F^{(1)}$, $S^{(1)}$ and $R^{(12)}$. Moreover, for a specific clustering task, not use all available attributes and relations are used after feature or relation selection pre-processing.

Mixed membership models, which assume that each object has mixed membership denoting its association with classes, have been widely used in the applications involving soft classification [16], such as matching words and pictures [39], race genetic structures [39, 48], and classifying scientific publications [15].

A relational mixed membership model is provided to cluster relational data (referred to as mixed membership relational clustering or MMRC).

Assume that each type of objects $X^{(j)}$ has $k_j$ latent classes. The membership vectors for all the objects in $X^{(j)}$ are represented as a membership matrix $\Lambda^{(j)} \in [0,1]^{k_j \times n_j}$ such that the sum of elements of each column $\Lambda_p^{(j)}$ is 1 and $\Lambda_p^{(j)}$ denotes the membership vector for object $x_p^{(j)}$, i.e., $\Lambda_{gp}^{(j)}$ denotes the probability that object $x_p^{(j)}$ associates with the $g^{th}$ latent class. The parameters of distributions to generate attributes, homogeneous relations and heterogeneous relations are expressed in matrix forms. Let $\Theta^{(j)} \in \mathbb{R}^{d_j \times k_j}$ denote the distribution parameter matrix for generating attributes $F^{(j)}$ such that $\Theta_g^{(j)}$ denotes the parameter vector associated with the $g^{th}$ latent class. Similarly, $\Gamma^{(j)} \in \mathbb{R}^{k_j \times k_j}$ denotes the parameter matrix for generating homogeneous relations $S^{(j)}$; $Y^{(ij)} \in \mathbb{R}^{k_i \times k_j}$ denotes the parameter matrix for generating heterogeneous relations $R^{(ij)}$. In summary, the parameters of MMRC model are $\Omega = \{\{\Lambda^{(j)}\}_{j=1}^m, \{\Theta^{(j)}\}_{j=1}^m, \{Y^{(ij)}\}_{i,j=1}^m\}$.

In general, the meanings of the parameters, $\Theta$, $\Lambda$, and $Y$, depend on the specific distribution assumptions. However, in Section 4.1, it is shown that for a large number of exponential family distributions, these parameters can be formulated as expectations with intuitive interpretations.

Next, the latent variables are introduced into the model. For each object $x_p^j$, a latent cluster indicator vector is generated based on its membership parameter $\Lambda_p^{(j)}$, which is denoted as $C_p^{(p)}$, i.e., $C^{(j)} \in \{0,1\}^{k_j \times n_j}$ is a latent indicator matrix for all the $j^{th}$ type objects in $X^{(j)}$.

Finally, we present the generative process of observations, $\{F^{(j)}\}_{j=1}^m \{S^{(j)}\}_{j=1}^m$, and $\{R^{(ij)}\}_{i,j=1}^m$ as follows:
1. For each object $x_p^{(j)}$
   Sample $C_p^{(j)} \sim$ multinomial $(\Lambda_p^{(j)}, 1)$.
2. For each object $x_p^{(j)}$
   Sample $F_p^{(j)} \sim \Pr(F_p^{(j)} | \Theta^{(j)} C_p^{(j)})$.
3. For each pair of objects $x_p^{(j)}$ and $x_q^{(j)}$
   Sample $S_{pq}^{(j)} \sim \Pr(S_{pq}^{(j)} | C_p^{(j)})^T \Gamma^{(j)} C_q^{(j)})$.
4. For each pair of objects $x_p^{(i)}$ and $x_q^{(j)}$
   Sample $R_{pq}^{(ij)} \sim \Pr(R_{pq}^{(ij)} | C_p^{(i)})^T \Upsilon^{(ij)} C_q^{(j)})$.

In the above generative process, a latent indicator vector for each object is generated based on multinomial distribution with the membership vector as parameters. Observations are generated independently conditioning on latent indicator variables. The parameters of condition distributions are formulated as products of the parameter matrices and latent indicators, i.e., $$Pr(F_p^{(j)} | C_p^{(j)}, \Theta^{(j)}) = Pr(F_p^{(j)} | \Theta^{(j)} C_p^{(j)}),$$

$$Pr(S_{pq}^{(j)} | C_p^{(j)}, C_q^{(j)}) = Pr(S_{pq}^{(j)} | (C_p^{(j)})^T \Gamma^{(j)} C_q^{(j)}) \text{ and}$$

$$Pr(R_{pq}^{(ij)} | C_p^{(i)}, C_q^{(j)}, Y^{(ij)}) = Pr(R_{pq}^{(ij)} | (C_p^{(i)})^T Y^{(ij)} C_q^{(j)}).$$

Under this formulation, an observation is sampled from the distributions of its associated latent classes. For example, if $C_p^{(i)}$ indicates that $x_p^{(i)}$ is with the $g^{th}$ latent class and $C_q^{(j)}$ indicates that $x_q^{(j)}$ is with the $h^{th}$ latent class, then $(C_p^{(i)})^T Y^{(ij)} C_q^{(j)} = Y_{gh}^{(ij)}$. Hence, $\Pr(R_{pq}^{(ij)} | Y_{gh}^{(ij)})$ implies that the relation between $x_p^{(i)}$ and $x_q^{(j)}$ is sampled by using the parameter $\gamma_{gh}^{(ij)}$.

With matrix representation, the joint probability distribution over the observations and the latent variables can be formulated as follows, $$Pr(\Psi | \Omega) = \prod_{j=1}^m Pr(C^{(j)} | \Lambda^{(j)}) \quad (1)$$

$$\prod_{j=1}^m Pr(F^{(j)} | \Theta^{(j)} C^{(j)}) \prod_{j=1}^m Pr(S^{(j)} | C^{(j)})^T \Gamma^{(j)} C^{(j)})$$

$$\prod_{i=1}^m \prod_{j=1}^m Pr(R^{(ij)} | C^{(i)})^T Y^{(ij)} C^{(j)})$$

where $\Psi = \{\{C^{(j)}\}_{j=1}^m, \{F^{(j)}\}_{j=1}^m, \{R^{(ij)}\}_{i,j=1}^m\}$, $Pr(C^{(j)} | \Lambda^{(j)}) = \Pi_{p=1}^{n_j}$ multinomial$(\Lambda_p^{(j)})$, $Pr(F^{(j)} | \Theta^{(j)} C^{(j)}) = \Pi_{p=1}^{n_j} Pr(F_p^{(j)} | \Theta^{(j)} C_p^{(j)})$, $Pr(S^{(j)} | C^{(j)})^T \Gamma^{(j)} C^{(j)}) = \Pi_{p,q=1}^{n_j} Pr(S_{pq}^{(j)} | C_p^{(j)})^T \Gamma^{(j)} C_q^{(j)})$, and similarly for $R^{(ij)}$.

4. Algorithm Derivation

In this section, the parametric soft and hard relational clustering algorithms based on the MMRC model are derived under a large number of exponential family distributions.

4.1 MMRC with Exponential Families

To avoid clutter, instead of general relational data, relational data similar to the one in FIG. 1(b) may be employed, which is a representative relational data set containing all three types of information for relational data, attributes, homogeneous relations and heterogeneous relations. However, the derivation and algorithms are applicable to general relational data. For the relational data set in FIG. 1(b), there are two types of objects, one attribute matrix F, one homogeneous relation matrix S and one heterogeneous relation matrix R. Based on Eq.(1), we have the following likelihood function, $$L(\Omega | \Psi) = Pr(C^{(1)} | \Lambda^{(1)}) Pr(C^{(2)} | \Lambda^{(2)}) Pr(F | \Theta C^{(1)}) Pr(S | C^{(1)})^T \Gamma C^{(1)}) Pr(R | C^{(1)})^T Y C^{(2)}) \quad (2)$$

One goal is to maximize the likelihood function in Eq. (2) to estimate unknown parameters.

For the likelihood function in Eq.(2), the specific forms of condition distributions for attributes and relations depend on specific applications. Presumably, for a specific likelihood function, a specific algorithm should be derived. However, a large number of useful distributions, such as normal distribution, Poisson distribution, and Bernoulli distributions, belong to exponential families and the distribution functions of exponential families can be formulated as a general form. This advantageous property facilitates derivation of a general EM algorithm for the MMRC model.

It is shown in the literature [3, 9] that there exists bijection between exponential families and Bregman divergences [40]. For example, the normal distribution, Bernoulli distribution, multinomial distribution and exponential distribution correspond to Euclidean distance, logistic loss, KL-divergence and Itakura-Satio distance, respectively. Based on the bijection, an exponential family density Pr(x) can always be formulated as the following expression with a Bregman divergence $D_\phi$, $$Pr(x) = \exp(-D_\phi(x,\mu))f_\phi(x), \quad (3)$$

where $f_\phi(x)$ is a uniquely determined function for each exponential probability density, and $\mu$ is the expectation parameter. Therefore, for the MMRC model under exponential family distributions:

$$Pr(F|\Theta C^{(1)}) = \exp(-\phi_1(F|\Theta C^{(1)}))f_{\phi_1}(F) \quad (4)$$

$$Pr((S|(C^{(1)})^T\Gamma C^{(1)}) = \exp(-D_{\phi_2}(S|(C^{(1)})^T\Gamma C^{(1)}))f_{\phi_2}(S) \quad (5)$$

$$Pr(R|(C^{(1)})^T\Upsilon C^{(2)}) = \exp(-D_{\phi_3}(R,(C^{(1)})^T\Upsilon C^{(2)}))f_{\phi_3}(R) \quad (6)$$

In the above equations, a Bregman divergence of two matrices is defined as the sum of the Bregman divergence of each pair of elements from the two matrices. Another advantage of the above formulation is that under this formulation, the parameters, $\Theta$, $\Lambda$, and $\Upsilon$, are expectations of intuitive interpretations. $\Theta$ consists of center vectors of attributes; $\Gamma$ provides an intuitive summary of cluster structure within the same type objects, since $\Gamma_{gh}^{(1)}$ implies expectation relations between the $g^{th}$ cluster and the $h^{th}$ cluster of type 1 objects; similarly, $\Upsilon$ provides an intuitive summary for cluster structures between the different type objects. In the above formulation, different Bregman divergences are used, $D_{\phi_1}$, $D_{\phi_2}$, and $D_{\phi_3}$, for the attributes, homogeneous relations and heterogeneous relations, since they could have different distributions in real applications. For example, suppose $$\Theta^{(1)} = \begin{bmatrix} 1.1 & 2.3 \\ 1.5 & 2.5 \end{bmatrix}$$

for normal distribution, $$\Gamma^{(12)} = \begin{bmatrix} 0.9 & 0.1 \\ 0.1 & 0.7 \end{bmatrix}$$

for Bernoulli distribution, and $$\Upsilon^{(12)} = \begin{bmatrix} 1 & 3 \\ 3 & 1 \end{bmatrix}$$

for Poisson distribution; then the cluster structures of the data are very intuitive. First, the center attribute vectors for the two clusters of type 1 are $$\begin{bmatrix} 1.1 \\ 1.5 \end{bmatrix}$$

and $$\begin{bmatrix} 2.3 \\ 2.5 \end{bmatrix};$$

second, by $\Gamma^{(1)}$ we know that the type 1 nodes from different clusters are barely related and cluster 1 is denser that cluster 2; third, by $\Upsilon^{(12)}$ we know that cluster 1 of type 1 nodes are related to cluster 2 of type 2 nodes more strongly than to cluster 1 of type 2, and so on so forth.

Since the distributions of $C^{(1)}$ and $C^{(2)}$ are modeled as multinomial distributions:

$$Pr(C^{(1)}|\Lambda^{(1)}) = \prod_{p=1}^{n_1} \prod_{g=1}^{k_1} (\Lambda_{gp}^{(1)})^{C_{gp}^{(1)}}, \quad (7)$$

$$Pr(C^{(2)}|\Lambda^{(2)}) = \prod_{q=1}^{n_2} \prod_{h=1}^{k_2} (\Lambda_{gp}^{(2)})^{C_{gp}^{(2)}} \quad (8)$$

Substituting Eqs. (4), (5), (6), (7), and (8) into Eq. (2) and taking some algebraic manipulations, the following log-likelihood function is obtained for MMRC under exponential families, $$\log L(\Omega|\Psi) = \sum_{p=1}^{n_1} \sum_{g=1}^{k_1} C_{gp}^{(1)} \log \Lambda_{gp}^{(1)} + \sum_{q=1}^{n_2} \sum_{h=1}^{k_2} C_{hq}^{(2)} \log \Lambda_{gp}^{(2)} - \quad (9)$$

$$D_{\phi 1}(F, \Theta C^{(1)}) - D_{\phi_2}(S, (C^{(1)})^T \Gamma C^{(1)}) - D_{\phi_3}(R, C^{(1)})^T \Upsilon C^{(2)} + \tau$$

where $\tau = \log f_{\phi_1}(F) + \log f_{\phi_2}(S) + \log f_{\phi_3}(R)$, which is a constant in the log-likelihood function.

Expectation Maximization (EM) is a general approach to find the maximum-likelihood estimate of the parameters when the model has latent variables. EM does maximum likelihood estimation by iteratively maximizing the expectation of the complete (log-)likelihood, which is the following under the MMRC model, $$Q(\Omega, \tilde{\Omega}) = E[\log(L(\Omega|\Psi))|C^{(1)}, C^{(2)}, \tilde{\Omega}] \quad (10)$$

where $\tilde{\Omega}$ denotes the current estimation of the parameters and $\Omega$ is the new parameters that we optimize to increase Q. Two steps, E-step (expectation step) and M-step (minimization step), are alternatively performed to maximize the objective function in Eq. (10).

4.2 Monte Carlo E-step

In the E-step, based on Bayes's rule, the posterior probability of the latent variables, $$Pr(C^{(1)}, C^{(2)}|F, S, R, \tilde{\Omega}) = \frac{Pr(C^{(1)}, C^{(2)}, F, S, R|\tilde{\Omega})}{\sum_{C^{(1)}, C^{(2)}} Pr(C^{(1)}, C^{(2)}, F, S, R|\tilde{\Omega})} \quad (11)$$

is updated using the current estimation of the parameters. However, conditioning on observations, the latent variables are not independent, i.e., there exist dependencies between the posterior probabilities of $C^{(1)}$ and $C^{(2)}$, and between those of $C_{\cdot p}^{(1)}$ and $C_{\cdot q}^{(1)}$. Hence, directly computing the posterior based on Eq. (11) is prohibitively expensive.

There exist several techniques for computing intractable posterior, such as Monte Carlo approaches, belief propagation, and variational methods. A Monte Carlo approach, Gibbs sampler, is further analyzed, which is a method of constructing a Markov chain whose stationary distribution is the distribution to be estimated. It is of course understood that other known techniques may be employed.

It is relatively easy to compute the posterior of a latent indicator vector while fixing all other latent indicator vectors, i.e., $$Pr(C_{\cdot p}^{(1)}, C_{\cdot -p}^{(1)}, C^{(2)}, F, S, R, \tilde{\Omega}) = \frac{Pr(C^{(1)}, C^{(2)}, F, S, R | \tilde{\Omega})}{\sum_{C_{\cdot p}^{(1)}} Pr(C^{(1)}, C^{(2)}, F, S, R | \tilde{\Omega})} \quad (12)$$

where $C_{\cdot -p}^{(1)}$ denotes all the latent indicator vectors except for $C_{\cdot p}^{(1)}$. Therefore, the following Markov chain is presented to estimate the posterior in Eq. (11).

Sample $C_{\cdot 1}^{(1)}$ from distribution $Pr(C_{\cdot 1}^{(1)} | C_{\cdot -1}^{(1)}, C^{(2)}, F, S, R, \tilde{\Omega})$

...

Sample $C_{\cdot n_1}^{(1)}$ from distribution $Pr(C_{\cdot n_1}^{(1)} | C_{\cdot -n_1}^{(1)}, C^{(2)}, F, S, R, \tilde{\Omega})$ Sample $C_{\cdot 1}^{(2)}$ from distribution $Pr(C_{\cdot 1}^{(2)} | C_{\cdot -1}^{(2)}, C^{(1)}, F, S, R, \tilde{\Omega})$

...

Sample $C_{\cdot n_2}^{(2)}$ from distribution $Pr(C_{\cdot n_2}^{(2)} | C_{\cdot -n_2}^{(2)}, C^{(1)}, F, S, R, \tilde{\Omega})$;

Note that at each sampling step in the above procedure, the latent indicator variables sampled from previous steps are used. The above procedure iterates until the stop criterion is satisfied. It can be shown that the above procedure is a Markov chain converging to $Pr(C^{(1)}, C^{(2)} | F, S, R, \tilde{\Omega})$. Assume that we keep l samples for estimation; then the posterior can be obtained simply by the empirical joint distribution of $C^{(1)}$ and $C^{(2)}$ in the l samples.

4.3 M-step

After the E-step, the posterior probability of latent variables is available to evaluate the expectation of the complete log-likelihood, $$Q(\Omega, \tilde{\Omega}) = \sum_{C^{(1)}, C^{(2)}} \log(L(\Omega | \Psi)) Pr(C^{(1)}, C^{(2)} | F, S, R, \tilde{\Omega}) \quad (13)$$

In the M-step, the unknown parameters are optimized by $$\Omega^* = \underset{\Omega}{\operatorname{argmax}} Q(\Omega, \tilde{\Omega}) \quad (14)$$

First, the update rules for membership parameters $\Lambda^{(1)}$ and $\Lambda^{(2)}$ are derived. To derive the expression for each $\Lambda_{hp}^{(1)}$, the Lagrange multiplier $\alpha$ is introduced with the constraint $\sum_{g=1}^{k_1} \Lambda_{gp}^{(1)} = 1$, and the following equation solved, $$\frac{\partial}{\partial \Lambda_{hp}^{(1)}} \left\{ Q(\Omega, \tilde{\Omega}) + \alpha \left( \sum_{g=1}^{k_1} \Lambda_{gp}^{(1)} - 1 \right) \right\}. \quad (15)$$

Substituting Eqs. (9) and (13) into Eq. (15), after some algebraic manipulations:

$$Pr(C_{hp}^{(1)} = 1 | F, S, R, \Omega) - \alpha \Lambda_{hp}^{(1)} = 0 \quad (16)$$

Summing both sides over h, $\alpha = 1$ is obtained, resulting in the following update rule, $$\Lambda_{hp}^{(1)} = Pr(C_{hp}^{(1)} = 1 | F, S, R, \tilde{\Omega}), \quad (17)$$

i.e., $\Lambda_{hp}^{(1)}$ is updated as the posterior probability that the $p^{th}$ object is associated with the $h^{th}$ cluster. Similarly, the following update rule for $\Lambda_{hp}^{(2)}$ is provided:

$$\Lambda_{hp}^{(2)} = Pr(C_{hp}^{(2)} = 1 | F, S, R, \tilde{\Omega}) \quad (18)$$

Second, the update rule for $\Theta$ is derived. Based on Eqs. (9) and (13), optimizing $\Theta$ is equivalent to the following optimization, $$\underset{\Theta}{\operatorname{argmin}} \sum_{C^{(1)}, C^{(2)}} D_{\phi_1}(F, \Theta C^{(1)}) Pr(C^{(1)} C^{(2)} | F, S, R, \tilde{\Omega}) \quad (19)$$

The above expression may be reformulated as, $$\underset{\Theta}{\operatorname{argmin}} \sum_{C^{(1)}} \sum_{g=1}^{k_1} \sum_{p: C_{gp}^{(1)} = 1} D_{\phi_1}(F_{\cdot p}, \Theta_{\cdot g}) Pr(C_{gp}^{(1)} = 1 | F, S, R, \tilde{\Omega}). \quad (20)$$

To solve the above optimization, an important property of Bregman divergence presented in the following theorem may be used.

Theorem 1.

Let X be a random variable taking values in $\chi = \{x_i\}_{i=1}^n \in S \subseteq \mathbb{R}^d$ following $v$. Given a Bregman divergence $D_\phi : S \times \operatorname{int}(S) \to [0, \infty)$, the problem $$\min_{s \in S} E_v[D_\phi(X, s)] \quad (21)$$

has a unique minimizer given by $s^* = E_v[X]||$

The proof of Theorem 1 is omitted (please refer [3, 40]). Theorem 1 states that the Bregman representative of a random variable is always the expectation of the variable. Based on Theorem 1 and the objective function in (20), we update $\Theta_{\cdot g}$ as follows, $$\Theta_{\cdot g} = \frac{\sum_{p=1}^{n_1} F_{\cdot p} Pr(C_{gp}^{(1)} = 1 | F, S, R, \tilde{\Omega})}{\sum_{p=1}^{n_1} Pr(C_{gp}^{(1)} = 1 | F, S, R, \tilde{\Omega})} \quad (22)$$

Third, the update rule for $\Gamma$ is derived. Based on Eqs. (9) and (13), optimizing $\Gamma$ is formulated as the following optimization, $$\underset{\Gamma}{\operatorname{argmin}} \sum_{C^{(1)}} \sum_{g=1}^{k_1} \sum_{h=1}^{k_1} \sum_{\substack{p: C_{gp}^{(1)} = 1 \\ q: C_{hq}^{(1)} = 1}} D_{\phi_2}(S_{pq}, \Gamma_{gh}) \tilde{p} \quad (23)$$

where $\tilde{p}$ denotes $Pr(C_{gp}^{(1)} = 1, C_{hq}^{(1)} = 1 | F, S, R, \tilde{\Omega})$ and $1 \leq p$; $q \leq n_1$. Based on Theorem 1, we update each $\Gamma_{gh}$ as follows, $$\Gamma_{gh} = \frac{\sum_{p,q=1}^{n_1} S_{pq} Pr(C_{gp}^{(1)} = 1, C_{hq}^{(1)} = 1 | F, S, R, \tilde{\Omega})}{\sum_{p,q=1}^{n_1} Pr(C_{gp}^{(1)} = 1, C_{hq}^{(1)} = 1 | F, S, R, \tilde{\Omega})} \quad (24)$$

Fourth, the update rule for Y is derived. Based on Eqs. (9) and (13), optimizing Y is formulated as the following optimization, $$\underset{\Upsilon}{\operatorname{argmin}} \sum_{C^{(1)}, C^{(2)}} \sum_{g=1}^{k_1} \sum_{h=1}^{k_2} \sum_{\substack{p: C_{gp}^{(1)}=1 \\ q: C_{hq}^{(2)}=1}} D_{\phi_3}(R_{pq}, \Upsilon_{gh}) \tilde{p}, \quad (25)$$

where $\tilde{p}$ denotes $\Pr(C_{gp}^{(1)}=1, C_{hq}^{(2)}=1 | F, S, R, \tilde{\Omega})$, $1 \leq p \leq n_1$ and $1 \leq q \leq n_2$. Based on Theorem 1, each $\Upsilon_{gh}$ is updated as follows, $$\Upsilon_{gh} = \frac{\sum_{p=1}^{n_1} \sum_{q=1}^{n_2} R_{pq} \Pr(C_{gp}^{(1)}=1, C_{hq}^{(2)}=1 | F, S, R, \tilde{\Omega})}{\sum_{p=1}^{n_1} \sum_{q=1}^{n_2} \Pr(C_{gp}^{(1)}=1, C_{hq}^{(2)}=1 | F, S, R, \tilde{\Omega})} \quad (26)$$

Combining the E-step and M-step, a general relational clustering algorithm is provided, Exponential Family MMRC (EF-MMRC) algorithm, which is summarized in Algorithm 1. Since it is straightforward to apply the algorithm derivation to a relational data set of any structure, Algorithm 1 is proposed based on the input of a general relational data set. Despite that the input relational data could have various structures, EF-MMRC works simply as follows: in the E-step, EF-MMRC iteratively updates the posterior probabilities that an object is associated with the clusters (the Markov chain in Section 4.2); in the M-step, based on the current cluster association (posterior probabilities), the cluster representatives of attributes and relations are updated as the weighted mean of the observations no matter which exponential distributions are assumed.

Therefore, with the simplicity of the traditional centroid-based clustering algorithms, EF-MMRC is capable of making use of all attribute information and homogeneous and heterogenous relation information to learn hidden structures from various relational data. Since EF-MMRC simultaneously clusters multi-type interrelated objects, the cluster structures of different types of objects may interact with each other directly or indirectly during the clustering process to automatically deal with the influence propagation. Besides the local cluster structures for each type of objects, the output of EF-MMRC also provides the summary of the global hidden structure for the data, i.e., based on $\Gamma$ and $Y$, we know how the clusters of the same type and different types are related to each other. Furthermore, relational data from different applications may have different probabilistic distributions on the attributes and relations; it is easy for EF-MMRC to adapt to this situation by simply using different Bregman divergences corresponding to different exponential family distributions.

Algorithm 1 Exponential Family MMRC Algorithm

Input: A relational data set $\{\{F^{(j)}\}_{j=1}^m, \{S^{(j)}\}_{j=1}^m, \{R^{(ij)}\}_{i,j=1}^m\}$, a set of exponential family distributions (Bregman divergences) assumed for the data set.

Output: Membership Matrices $\{\Lambda^{(j)}\}_{j=1}^m$,
attribute expectation matrices $\{\Theta^{(j)}\}_{j=1}^m$,
homogeneous relation expectation matrices $\{\Gamma^{(j)}\}_{j=1}^m$, and
heterogeneous relation expectation matrices $\{Y^{(ij)}\}_{i,j=1}^m$.

Method:

1: Initialize the parameters as $\tilde{\Omega} = \{\{\tilde{\Lambda}^{(j)}\}_{j=1}^m, \{\tilde{\Theta}^{(j)}\}_{j=1}^m, \{\tilde{\Gamma}^{(j)}\}_{j=1}^m, \{\tilde{Y}^{(ij)}\}_{i,j=1}^m\}$.

2: repeat

3: {E-step}

4: Compute the posterior $\Pr(\{C^{(j)}\} | \{F^{(j)}\}_{j=1}^m, \{S^{(j)}\}_{j=1}^m, \{R^{(ij)}\}_{i,j=1}^m, \tilde{\Omega})$ using the Gibbs sampler.

5: {M-step}

6: for j=1 to m do

7: Compute $\Lambda^{(j)}$ using update rule (17).

8: Compute $\Theta^{(j)}$ using update rule (22).

9: Compute $\Gamma^{(j)}$ using update rule (24).

10: for i=1 to m do

11: Compute $Y^{(ij)}$ using update rule (26).

12: end for

13: end for

14: $\tilde{\Omega} = \Omega$

15: until convergence

If we assume O(m) types of heterogeneous relations among m types of objects, which is typical in real applications, and let $n = \Theta(n_i)$ and $k = \Theta(k_i)$, the computational complexity of EF-MMRC can be shown to be $O(tmn^2k)$ for t iterations. If the k-means algorithm are applied to each type of nodes individually by transforming the relations into attributes for each type of nodes, the total computational complexity is also $O(tmn^2k)$.

4.4 Hard MMRC Algorithm

Due to its simplicity, scalability, and broad applicability, k-means algorithm has become one of the most popular clustering algorithms. Hence, it is desirable to extend k-means to relational data. Some efforts [47, 2, 12, 33] in the literature work in this direction. However, these approaches apply to only some special and simple cases of relational data, such as bi-type heterogeneous relational data.

As traditional k-means can be formulated as a hard version of Gaussian mixture model EM algorithm [29], the hard version of MMRC algorithm is presented as a general relational k-means algorithm (Algorithm 1 is herein referred to as "soft EF-MMRC"), which applies to various relational data.

To derive the hard version MMRC algorithm, soft membership parameters $\Lambda^{(j)}$ are omitted in the MMRC model ($C^{(j)}$ in the model provides the hard membership for each object). Next, the computation of the posterior probabilities in the E-step is changed to a reassignment procedure, i.e., in the E-step, based on the estimation of the current parameters, cluster labels, $\{C^{(j)}\}_{j=1}^m$, are reassigned to maximize the objective function in (9). In particular, for each object, while fixing the cluster assignments of all other objects, each cluster is assigned to find the optimal cluster assignment maximizing the objective function in (9), which is equivalent to minimizing the Bregman distances between the observations and the corresponding expectation parameters. After all objects are assigned, the re-assignment process is repeated until no object changes its cluster assignment between two successive iterations.

In the M-step, the parameters are estimated based on the cluster assignments from the E-step. A simple way to derive the update rules is to follow the derivation in Section 4.3 but replace the posterior probabilities by its hard versions. For example, after the E-step, if the object $x_h^{(p)}$ is assigned to the $g^{th}$ cluster, i.e., $C_{gp}^{(j)}=1$, then the posterior $\Pr(C_{gp}^{(1)})=1 | F, S, R, \tilde{\Omega}=1$ and $\Pr(C_{hp}^{(1)})=1 | F, S, R, \tilde{\Omega}=0$ for $h \neq g$.

Using the hard versions of the posterior probabilities, the following update rule is derived:

$$\Theta_{.g}^{(j)} = \frac{\sum_{p:C_{gp}^{(j)}=1} F_{.p}^{(j)}}{\sum_{p=1}^{n_j} C_{gp}^{(j)}}. \tag{27}$$

In the above update rule, since $\Sum_{p=1}^{n_1} C_{gp}^{(j)}$ is the size of the $g^{th}$ cluster, $\Theta_{.g}^{(j)}$ is actually updated as the mean of the attribute vectors of the objects assigned to the $g^{th}$ cluster. Similarly, the following update rule:

$$\Gamma_{gh}^{(j)} = \frac{\sum_{p:C_{gp}^{(j)}=1,q:C_{hq}^{(j)}=1} S_{pq}^{(j)}}{\sum_{p=1}^{n_j} C_{gp}^{(j)} \sum_{q=1}^{n_j} C_{hq}^{(j)}} \tag{28}$$

i.e., $\Gamma_{gh}^{(j)}$ is updated as the mean of the relations between the objects of the $j^{th}$ type from the $g^{th}$ cluster and from the $h^{th}$ cluster.

Each heterogeneous relation expectation parameter $Y_{gh}^{(ij)}$ is updated as the mean of the objects of the $i^{th}$ type from the $g^{th}$ cluster and of the $j^{th}$ type from the $h^{th}$ cluster, $$Y_{gh}^{(ij)} = \frac{\sum_{p:C_{gp}^{(i)}=1,q:C_{hq}^{(j)}=1} R_{pq}^{(ij)}}{\sum_{p=1}^{n_i} C_{gp}^{(i)} \sum_{q=1}^{n_j} C_{hq}^{(j)}} \tag{29}$$

The hard version of EF-MMRC algorithm is summarized in Algorithm 2. It works simply as the classic k-means. However, it is applicable to various relational data under various Bregman distance functions corresponding to various assumptions of probability distributions. Based on the EM framework, its convergence is guaranteed. When applied to some special cases of relational data, it provides simple and new algorithms for some important data mining problems. For example, when applied to the data of one homogeneous relation matrix representing a graph affinity matrix, it provides a simple and new graph partitioning algorithm.

Based on Algorithms 1 and 2, there is another version of EF-MMRC, i.e., soft and hard EF-MMRC may be combined together to have mixed EF-MMRC. For example, hard EF-MMRC may be run several times as initialization, then soft EF-MMRC run.

Algorithm 2 Hard MMRC Algorithm

Input: A relational data set $\{\{F^{(j)}\}_{j=1}^{m}, \{S^{(j)}\}_{j=1}^{m}, \{R^{(ij)}\}_{i,j=1}^{m}\}$, a set of exponential family distributions (Bregman divergences) assumed for the data set.

Output: Cluster indicator matrices $\{C^{(j)}\}_{j=1}^{m}$, attribute expectation matrices $\{\Theta^{(j)}\}_{j=1}^{m}$, homogeneous relation expectation matrices $\{\Gamma^{(j)}\}_{j=1}^{m}$, and heterogeneous relation expectation matrices $\{Y^{(ij)}\}_{i,j=1}^{m}$.

Method:
1: Initialize the parameters as $\tilde{\Omega}=\{\{\tilde{\Lambda}^{(j)}\}_{j=1}^{m}, \{\tilde{\Theta}^{(j)}\}_{j=1}^{m}, \{\tilde{\Gamma}^{(j)}\}_{j=1}^{m}, \{\tilde{Y}^{(ij)}\}_{i,j=1}^{m}\}$.
2: repeat
3: {E-step}
4: Based on the current parameters, reassign cluster labels for each objects, i.e., update $\{C^{(j)}\}_{j=1}^{m}$, to maximize the objective function in Eq. (9).
5: {M-step}
6: for j=1 to m do
7: Compute $\Theta^{(j)}$ using update rule (27).
8: Compute $\Gamma^{(j)}$ using update rule (28).
9: for i=1 to m do
10: Compute $Y^{(ij)}$ using update rule (29).
11: end for
12: end for
13: $\tilde{\Omega}=\Omega$
14: until convergence 5. A Unified View to Clustering The connections between existing clustering approaches and the MMRF model and EF-MMRF algorithms are now discussed. By considering them as special cases or variations of the MMRF model, MMRF is shown to provide a unified view to the existing clustering approaches from various important data mining applications.

5.1 Semi-supervised Clustering

Recently, semi-supervised clustering has become a topic of significant interest [4, 46], which seeks to cluster a set of data points with a set of pairwise constraints.

Semi-supervised clustering can be formulated as a special case of relational clustering, clustering on the single-type relational data set consisting of attributes F and homogeneous relations S. For semi-supervised clustering, $S_{pq}$ denotes the pairwise constraint on the pth object and the qth object.

[4] provides a general model for semi-supervised clustering based on Hidden Markov Random Fields (HMRFs). It can be formulated as a special case of MMRC model. As in [4], the homogeneous relation matrix S can be defined as follows, $$S_{pq} = \begin{cases} f_M(x_p, x_q) & \text{if } (x_p, x_q) \in M \\ f_C(x_p, x_q) & \text{if } (x_p, x_q) \in C \\ 0 & \text{otherwise} \end{cases}$$

where $\colon$ denotes a set of must-link constraints;

$\varPi$ denotes a set of cannot-link constraints;

$f_M(x_p, x_q)$ is a function that penalizes the violation of must-link constraint; and $f_C(x_p, x_q)$ is a penalty function for cannot-links.

If a Gibbs distribution [41] is assumed for S, $$Pr(S) = \frac{1}{z_1} \exp\left(-\sum_{p,q} S_{pq}\right) \tag{30}$$

where $z_1$ is the normalization constant. Since [4] focuses on only hard clustering, the soft member parameters may be omitted in the MMRC model to consider hard clustering.

Based on Eq.(30) and Eq.(4), the likelihood function of hard semi-supervised clustering under MMRC model is $$l(\Theta)|F) = \frac{1}{z}\exp\left(-\sum_{p,q} S_{pq}\right)\exp(-D_\phi(F, \Lambda C)) \quad (31)$$

Since C is an indicator matrix, Eq. (31) can be formulated as $$l(\Theta)|F) = \frac{1}{z}\exp\left(-\sum_{p,q} S_{pq}\right)\exp\left(-\sum_{g=1}^{k}\sum_{p:C_{gp}=1} D_\phi(F_{\cdot p}, \Lambda_{\cdot g})\right) \quad (32)$$

The above likelihood function is equivalent to the objective function of semi-supervised clustering based on HMRFs [4]. Furthermore, when applied to optimizing the objective function in Eq.(32), hard MMRC provides a family of semi-supervised clustering algorithms similar to HMRF-K Means in [4]; on the other hand, soft EF-MMRC provides new and soft version semi-supervised clustering algorithms.

5.2 Co-clustering

Co-clustering or bi-clustering arise in many important applications, such as document clustering, micro-array data clustering. A number of approaches [12, 8, 33, 2] have been proposed for co-clustering. These efforts can be generalized as solving the following matrix approximation problem [34], $$\underset{C,\Upsilon}{\arg\min}\mathfrak{D}\left(R, (C^{(1)})^T \Upsilon C^{(2)}\right) \quad (33)$$

where $R \in \mathbb{R}^{n_1 \times n_n}$ is the data matrix, $C^{(1)} \in \{0,1\}^{k_1 \times n_1}$ and $C^{(2)} \in \{0,1\}^{k_2 \times n_2}$ are indicator matrices, $\Upsilon \in \mathbb{R}^{k_1 \times k_2}$ is the relation representative matrix, and $\mathfrak{D}$ is a distance function. For example, [12] uses KL-divergences as the distance function; [8, 33] use Euclidean distances.

Co-clustering is equivalent to clustering on relational data of one heterogeneous relation matrix R. Based on Eq.(9), by omitting the soft membership parameters, maximizing log-likelihood function of hard clustering on a heterogeneous relation matrix under the MMRC model is equivalent to the minimization in (33). The algorithms proposed in [12, 8, 33, 2] can be viewed as special cases of hard EF-MMRC. At the same time, soft EF-MMRC provides another family of new algorithms for co-clustering.

[34] proposes the relation summary network model for clustering k-partite graphs, which can be shown to be equivalent on clustering on relational data of multiple heterogeneous relation matrices. The proposed algorithms in [34] can also be viewed as special cases of the hard EF-MMRC algorithm.

5.3 Graph Clustering

Graph clustering (partitioning) is an important problem in many domains, such as circuit partitioning, VLSI design, task scheduling. Existing graph partitioning approaches are mainly based on edge cut objectives, such as Kernighan-Lin objective [30], normalized cut [42], ratio cut [7], ratio association[42], and min-max cut [13].

Graph clustering is equivalent to clustering on single-type relational data of one homogeneous relation matrix S. The log-likelihood function of the hard clustering under MMRC model is $-D_\Phi(S,(C)^T \Gamma C)$. We propose the following theorem to show that the edge cut objectives are mathematically equivalent to a special case of the MMRC model. Since most graph partitioning objective functions use weighted indicator matrix such that $CC^T=I_k$, where $I_k$ is an identity matrix, we follow this formulation in the following theorem.

Theorem 2.

With restricting $\Gamma$ to be the form of $rI_k$ for $r>0$, maximizing the log-likelihood of hard MMRC clustering on S under normal distribution, i.e., $$\underset{C \in \{0,1\}^{k \times n}, CC^T=I_k}{\max} -\|S - (C)^T(rI_k)C\|^2, \quad (34)$$

is equivalent to the trace maximization $$\max tr(CSC^T), \quad (35)$$

where tr denotes the trace of a matrix.

Proof.

Let L denote the objective function in Eq. (34).

$$L = -\|S-rC^TC\|^2 = -tr((S-rC^TC)(S-rC^TC)) = -tr(S^TS) + 2rtr(C^TCS) - r^2tr(C^TCC^TC) = -tr(S^TS) + 2rtr(CSC^T) - r^2 k$$

The above deduction uses the property of trace tr(XY)=tr(YX). Since $tr(S^TS)$, r and k are constants, the maximization of L is equivalent to the maximization of $tr(CSC^T)$.

The proof is completed.

Since it is shown in the literature [10] that the edge cut objectives can be formulated as the trace maximization, Theorem 2 states that edge-cut based graph clustering is equivalent to MMRC model under normal distribution with the diagonal constraint on the parameter matrix $\Gamma$. This connection provides not only a new understanding for graph partitioning but also a family of new algorithms (soft and hard MMRC algorithms) for graph clustering.

Finally, we point out that MMRC model does not exclude traditional attribute-based clustering. When applied to an attribute data matrix under Euclidean distances, hard MMRC algorithm is actually reduced to the classic k-means; soft MMRC algorithm is very close to the traditional mixture model EM clustering except that it does not involve mixing proportions in the computation.

In summary, MMRC model provides a principal framework to unify various important clustering tasks including traditional attributes-based clustering, semi-supervised clustering, co-clustering and graph clustering; soft and hard EF-MMRC algorithms unify a number of state-of-the-art clustering algorithms and at the same time provide new solutions to various clustering tasks.

6. Experiments

This section provides empirical evidence to show the effectiveness of the MMRC model and algorithms. Since a number of state-of-the-art clustering algorithms [12, 8, 33, 2, 3, 4] can be viewed as special cases of EF-MMRC model and algorithms, the experimental results in these efforts also illustrate the effectiveness of the MMRC model and algorithms. MMRC algorithms are applied to tasks of graph clustering, bi-clustering, tri-clusering, and clustering on a general relational data set of all three types of information. In the experiments, mixed version MMRC was employed, i.e., hard MMRC initialization followed by soft MMRC. Although MMRC can adopt various distribution assumptions, due to space limit, MMRC is used under normal or Poisson distribution assumption in the experiments. However, this does not imply that they are optimal distribution assumptions for the data. Therefore, one can select or derive an optimal distribution assumption as may be appropriate.

For performance measure, the Normalized Mutual Information (NMI) [44] between the resulting cluster labels and the true cluster labels was used, which is a standard way to measure the cluster quality. The final performance score is the average of ten runs.

TABLE 1

Summary of relational data for Graph Clustering.

| Name | n | k | Balance | Source |
|---|---|---|---|---|
| tr11 | 414 | 9 | 0.046 | TREC |
| tr23 | 204 | 6 | 0.066 | TREC |
| NG1-20 | 14000 | 20 | 1.0 | 20-newsgroups |
| k1b | 2340 | 6 | 0.043 | WebACE |

6.1 Graph Clustering

Experiments on the MMRC algorithm are presented under normal distribution in comparison with two representative graph partitioning algorithms, the spectral graph partitioning (SGP) from [36] that is generalized to work with both normalized cut and ratio association, and the classic multilevel algorithm, METIS [28].

The graphs based on the text data have been widely used to test graph partitioning algorithms [13, 11, 25]. In this study, we use various data sets from the 20-newsgroups [32], WebACE and TREC [27], which cover data sets of different sizes, different balances and different levels of difficulties. The data are pre-processed by removing the stop words and each document is represented by a term-frequency vector using TF-IDF weights. Relational data are then constructed for each text data set such that objects (documents) are related to each other with cosine similarities between the term-frequency vectors. A summary of all the data sets to construct relational data used in this paper is shown in Table 1, in which n denotes the number of objects in the relational data, k denotes the number of true clusters, and balance denotes the size ratio of the smallest clusters to the largest clusters.

For the number of clusters k, the number of the true clusters is used. Determining the optimal number of clusters analytically is a model selection problem, otherwise this may be determined empirically or iteratively.

FIG. 2 shows the NMI comparison of the three algorithms. Although there is no single winner on all the graphs, it may be observed overall that the MMRC algorithm performs better than SGP and METIS. Especially on the difficult data set tr23, MMRC increases performance about 30%. Hence, MMRC under normal distribution provides a new graph partitioning algorithm which is viable and competitive compared with the two existing state-of-the-art graph partitioning algorithms. Note that although the normal distribution is most popular, MMRC under other distribution assumptions may be more desirable in specific graph clustering applications depends on the statistical properties of the graphs.

TABLE 2

Subsets of Newsgroup Data for bi-type relational data

| Dataset Name | Newsgroups Included | # Documents per Group | Total # Documents |
|---|---|---|---|
| BT-NG1 | rec.sport.baseball, rec.sport.hockey | 200 | 400 |
| BT-NG2 | comp.os.ms-windows.misc, comp.windows.x, rec.motorcycles, sci.crypt, sci.space | 200 | 1000 |

TABLE 2-continued

Subsets of Newsgroup Data for bi-type relational data

| Dataset Name | Newsgroups Included | # Documents per Group | Total # Documents |
|---|---|---|---|
| BT-NG3 | comp.os.ms-windows.misc, comp.windows.x, misc.forsale, rec.motorcycles, rec.motorcycles, sci.crypt, sci.space, talk.politics.mideast, talk.religion.misc | 200 | 1600 |

TABLE 3

Taxonomy structures of two data sets for constructing tri-partite relational data

| Data set | Taxonomy structure |
|---|---|
| TT-TM1 | {rec.sport.baseball, rec.sport.hockey}, {talk.politics.guns, talk.politics.mideast, talk.politics.misc} |
| TT-TM2 | {comp.graphics, comp.os.ms-windows.misc}, {rec.autos, rec.motorcycles}, {sci.crypt, sci.electronics } |

6.2 Biclustering and Triclustering

The MMRC algorithm are now applied under Poisson distribution to clustering bi-type relational data, word-document data, and tri-type relational data, word-document-category data. Two algorithms, Bi-partite Spectral Graph partitioning (BSGP) [11] and Relation Summary Network under Generalized I-divergence (RSN-GI) [34], are used as comparison in bi-clustering. For tri-clustering, Consistent Bipartite Graph Co-partitioning (CBGC) [18] and RSN-GI are used as comparison.

The bi-type relational data, word-document data, are constructed based on various subsets of the 20-Newsgroup data. The data is pre-processed by selecting the top 2000 words by the mutual information. The document-word matrix is based on tf.idf weighting scheme and each document vector is normalized to a unit $L_2$ norm vector. Specific details of the data sets are listed in Table 2. For example, for the data set BT-NG3 200 documents are randomly and evenly sampled from the corresponding newsgroups; then a bi-type relational data set of 1600 document and 2000 word is formulated.

The tri-type relational data are built based on the 20-newsgroups data for hierarchical taxonomy mining. In the field of text categorization, hierarchical taxonomy classification is widely used to obtain a better trade-off between effectiveness and efficiency than flat taxonomy classification. To take advantage of hierarchical classification, one must mine a hierarchical taxonomy from the data set. We see that words, documents, and categories formulate a sandwich structure tri-type relational data set, in which documents are central type nodes. The links between documents and categories are constructed such that if a document belongs to k categories, the weights of links between this document and these k category nodes are 1=k (please refer [18] for details). The true taxonomy structures for two data sets, TP-TM1 and TP-TM2, are documented in Table 3.

TABLE 4

Two Clusters from actor-movie data cluster 23 of actors

Viggo Mortensen, Sean Bean, Miranda Otto,
Ian Holm, Christopher Lee, Cate Blanchett,
Ian McKellen, Liv Tyler, David Wenham,
Brad Dourif, John Rhys-Davies, Elijah Wood,
Bernard Hill, Sean Astin, Andy Serkis,
Dominic Monaghan, Karl Urban, Orlando Bloom,
Billy Boyd, John Noble, Sala Baker cluster 118 of movies The Lord of the Rings: The Fellowship of the Ring (2001)
The Lord of the Rings: The Two Towers (2002)
The Lord of the Rings: The Return of the King (2003)

FIG. 3 and FIG. 4 show the NMI comparison of the three algorithms on bi-type and tri-type relational data, respectively. It may be observed that the MMRC algorithm performs significantly better than BSGP and CBGC. MMRC performs slightly better than RSN on some data sets. Since RSN is a special case of hard MMRC, this shows that mixed MMRC improves hard MMRC's performance on the data sets. Therefore, compared with the existing state-of-the-art algorithms, the MMRC algorithm performs more effectively on these bi-clustering or tri-clustering tasks and on the other hand, it is flexible for different types of multi-clustering tasks which may be more complicated than tri- type clustering.

6.3 A Case Study on Actor-movie Data

The MMRC algorithm was also run on the actor-movie relational data based on IMDB movie data set for a case study. In the data, actors are related to each other by collaboration (homogeneous relations); actors are related to movies by taking roles in movies (heterogeneous relations); movies have attributes such as release time and rating (note that there is no links between movies). Hence the data have all the three types of information. A data set of 20000 actors and 4000 movies is formulated. Experiments were run with k=200. Although there is no ground truth for the data's cluster structure, it may be observed that most resulting clusters that are actors or movies of the similar style such as action, or tight groups from specific movie serials. For example, Table 4 shows cluster 23 of actors and cluster 118 of movies; the parameter $Y_{23;118}$ shows that these two clusters are strongly related to each other. In fact, the actor cluster contains the actors in the movie series "The Lord of the Rings". Note that if we only have one type of actor objects, we only get the actor clusters, but with two types of nodes, although there are no links between the movies, we also get the related movie clusters to explain how the actors are related.

7. Conclusions

A probabilistic model is formulated for relational clustering, which provides a principal framework to unify various important clustering tasks including traditional attributes-based clustering, semi-supervised clustering, co-clustering and graph clustering. Under this model, parametric hard and soft relational clustering algorithms are presented under a large number of exponential family distributions. The algorithms are applicable to relational data of various structures and at the same time unify a number of state-of-the-art clustering algorithms. The theoretic analysis and experimental evaluation show the effectiveness and great potential of the model and algorithms.

The invention is applicable to various relational data from various applications. It is capable of adapting different distribution assumptions for different relational data with different statistical properties. While the above analysis discuss in depth certain types of statistical distributions, the system and method may be used with any statistical distribution. The resulting parameter matrices provides an intuitive summary for the hidden structure for relational data. Therefore, in addition to finding application in clustering data objects, the present system and method may be used for more general analysis of relationships of data, for other end purposes and/or as an intermediary step in a larger or more complex data analysis paradigm.

The present invention has significant versatility, and can be applied to a wide range of applications involving relational data. Examples include, but are not limited to:

(1) Clustering web documents using both text and link information;

(2) Rating prediction in a recommendation system;

(3) Community detection in social network analysis; and (4) Discovering gene patterns in bioinformatics application.

The present method may be implemented on a general purpose computer or a specially adapted machine. In the former case. Typically, a programmable processor will execute machine-readable instructions stored on a computer-readable medium. In other cases, the method will be implemented using application specific hardware, and may not be reprogrammable.

An exemplary programmable computing device for implementing an embodiment of the invention includes at least a processing unit and a memory. Depending on the exact configuration and type of computing device, the memory may be volatile (such as RAM), non-volatile (such as ROM, flash memory, etc.) or some combination of the two. Additionally, the device may also have additional features/functionality. For example, the device may also include additional storage (removable and/or non-removable) including, but not limited to, magnetic or optical disks or tapes. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory, FRAM, or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device. The device may also contain one or more communications connections that allow the device to communicate with other devices. Such communication connections may include, for example, Ethernet, wireless communications, optical communications, serial busses, parallel busses, and the like. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

One use for the present method is to process information databases, which may be private or public. For example, the information database may comprise information received from the Internet, such as the content of various web pages from world wide web sites, or other information found on the Internet. In other cases, the data may be more structured, for example the content of the Facebook social networking site/system. Further, the information may be private user information, such as the contents of a user's hard drive, especially, for example, the user generated or downloaded content.

Having described specific embodiments of the present invention, it will be understood that many modifications thereof will readily appear or may be suggested to those skilled in the art, and it is intended therefore that this invention is limited only by the spirit and scope of the following claims.

8. References

The following are expressly incorporated herein by reference:

Bo Long Mark (Zhongfei) Zhang, Philip S. Yu, "Graph Partitioning Based on Link Distributions", AAAI (2007).

Bo Long Mark (Zhongfei) Zhang, Philip S. Yu, "A Probabilistic Framework for Relational Clustering" KDD (2007).

Bo Long Mark (Zhongfei) Zhang, Xiaoyun Wu, Philip S. Yu, "Relational Clustering by Symmetric Convex Coding". Proceedings of the 24th International Conference on Machine Learning, Corvallis, Oreg. (2007).

[1] E. Airoldi, D. Blei, E. Xing, and S. Fienberg. Mixed membership stochastic block models for relational data with application to protein-protein interactions. In *ENAR*-2006.

[2] A. Banerjee, I. S. Dhillon, J. Ghosh, S. Merugu, and D. S. Modha. A generalized maximum entropy approach to bregman co-clustering and matrix approximation. In *KDD*, pages 509-514, 2004.

[3] A. Banerjee, S. Merugu, I. S. Dhillon, and J. Ghosh. Clustering with bregman divergences. *J. Mach. Learn. Res.*, 6:1705-1749, 2005.

[4] S. Basu, M. Bilenko, and R. J. Mooney. A probabilistic framework for semi-supervised clustering. In *KDD*04, pages 59-68, 2004.

[5] I. Bhattachrya and L. Getor. Entity resolution in graph data. Technical Report CS-TR-4758, University of Maryland, 2005.

[6] T. N. Bui and C. Jones. A heuristic for reducing fill-in in sparse matrix factorization. In *PPSC*, pages 445-452, 1993.

[7] P. K. Chan, M. D. F. Schlag, and J. Y. Zien. Spectral k-way ratio-cut partitioning and clustering. In *DAC '93*.

[8] H. Cho, I. Dhillon, Y. Guan, and S. Sra. Minimum sum squared residue co-clustering of gene expression data. In *SDM*, 2004.

[9] M. Collins, S. Dasgupta, and R. Reina. A generalizaion of principal component analysis to the exponential family. In *NIPS'01*, 2001.

[10] I. Dhillon, Y. Guan, and B. Kulis. A unified view of kernel k-means, spectral clustering and graph cuts. Technical Report TR-04-25, University of Texas at Austin, 2004.

[11] I. S. Dhillon. Co-clustering documents and words using bipartite spectral graph partitioning. In *KDD '01*.

[12] I. S. Dhillon, S. Mallela, and D. S. Modha. Information-theoretic co-clustering. In *KDD '03*, pages 89-98.

[13] C. H. Q. Ding, X. He, H. Zha, M. Gu, and H. D. Simon. A min-max cut algorithm for graph partitioning and data clustering. In *Proceedings of ICDM* 2001, pages 107-114, 2001.

[14] S. Dzeroski and N. Lavrac, editors. *Relational Data Mining*. Springer, 2001.

[15] E. Erosheva, S. Fienberg, and J. Lafferty. Mixed membership models of scientific publications. In *NAS*.

[16] E. Erosheva and S. E. Fienberg. Bayesian mixed membership models for soft clustering and classification. *Classification—The Ubiquitous Challenge*, pages 11-26, 2005.

[17] S. E. Fienberg, M. M. Meyer, and S. Wasserman. Satistical analysis of multiple cociometric relations. *Journal of American Satistical Association*, 80:51-87, 1985.

[18] B. Gao, T.-Y. Liu, X. Zheng, Q.-S. Cheng, and W.-Y. Ma. Consistent bipartite graph co-partitioning for star-structured high-order heterogeneous data co-clustering. In *KDD '05*, pages 41-50, 2005.

[19] L. Getoor. An introduction to probabilistic graphical models for relational data. *Data Engineering Bulletin*, 29, 2006.

[20] B. Hendrickson and R. Leland. A multilevel algorithm for partitioning graphs. In *Supercomputing '95*, page 28, 1995.

[21] P. Hoff, A. Rafery, and M. Handcock. Latent space approaches to social network analysis. *Journal of American Satistical Association*, 97:1090-1098, 2002.

[22] T. Hofmann. Probabilistic latent semantic analysis. In *Proc. of Uncertainty in Artificial Intelligence, UAI'99*, Stockholm, 1999.

[23] T. Hofmann and J. Puzicha. Latent class models for collaborative filtering. In *IJCAI'99*, Stockholm, 1999.

[24] L. B. Holder and D. J. Cook. Graph-based relational learning: current and future directions. *SIGKDD Explor. Newsl.*, 5(1):90-93, 2003.

[25] M. X. H. Zha, C. Ding and H. Simon. Bi-partite graph partitioning and data clustering. In *ACM CIKM'01*, 2001.

[26] G. Jeh and J. Widom. Simrank: A measure of structural-context similarity. In *KDD-2002*, 2002.

[27] G. Karypis. A clustering toolkit, 2002.

[28] G. Karypis and V. Kumar. A fast and high quality multilevel scheme for partitioning irregular graphs. *SIAM J. Sci. Comput.*, 20(1):359-392, 1998.

[29] M. Kearns, Y. Mansour, and A. Ng. An information-theoretic analysis of hard and soft assignment methods for clustering. In *UAI'97*, pages 282-293, 2004.

[30] B. Kernighan and S. Lin. An efficient heuristic procedure for partitioning graphs. *The Bell System Technical Journal*, 49(2):291-307, 1970.

[31] M. Kirsten and S. Wrobel. Relational distance-based clustering. In *Proc. Fachgruppentreffen Maschinelles Lernen (FGML-98)*, pages 119-124, 1998.

[32] K. Lang. News weeder: Learning to filter netnews. In *ICML*, 1995.

[33] T. Li. A general model for clustering binary data. In *KDD '05*, 2005.

[34] B. Long, X. Wu, Z. M. Zhang, and P. S. Yu. Unsupervised learning on k-partite graphs. In *KDD-2006*, 2006.

[35] B. Long, Z. Zhang, and P. Yu. Co-clustering by block value decomposition. In *KDD '05*, 2005.

[36] A. Ng, M. Jordan, and Y. Weiss. On spectral clustering: Analysis and an algorithm. In *Advances in Neural Information Processing Systems* 14, 2001.

[37] L. D. Raedt and H. Blockeel. Using logical decision trees for clustering. In *Proceedings of the 7th International Workshop on Inductive Logic Programming*, 1997.

[38] R. O. Duda, P. E. Hart, and D. G. Stork. *Pattern Classification*. John Wiley & Sons, New York, 2000.

[39] N. Rosenberg, J. Pritchard, J. Weber, and H. Cann. Genetic structure of human population. *Science*, 298, 2002.

[40] J. S. D. Pietra, V. D. Pietera. Duality and auxiliary functions for bregman distances. Technical Report CMU-CS-01-109, Carnegie Mellon University, 2001.
[41] S. Geman and D. Geman. Stochastic relaxation, gibbs distribution, and the bayesian restoration of images. *Pattern Analysis and Machine Intelligence,* 6:721-742, 1984.
[42] J. Shi and J. Malik. Normalized cuts and image segmentation. *IEEE Transactions on Pattern Analysis and Machine Intelligence,* 22(8):888-905, 2000.
[43] T. Snijders. Markov chain monte carlo estimation of exponential random graph models. *Journal of Ssocial Structure,* 2002.
[44] A. Strehl and J. Ghosh. Cluster ensembles {a knowledge reuse framework for combining partitionings. In *AAAI 2002,* pages 93-98, 2002.
[45] B. Taskar, E. Segal, and D. Koller. Probabilistic classification and clustering in relational data. In *Proceeding of IJCAI-01,* 2001.
[46] K. Wagstaff, C. Cardie, S. Rogers, and S. Schroedl. Constrained k-means clustering with background knowledge. In *ICML*-2001, pages 577-584, 2001.
[47] J. Wang, H. Zeng, Z. Chen, H. Lu, L. Tao, and W.-Y. Ma. Recom: reinforcement clustering of multi-type interrelated data objects. In *SIGIR* '03, pages 274-281, 2003.
[48] E. Xing, A. Ng, M. Jorda, and S. Russel. Distance metric learning with applications to clustering with side information. In *NIPS*'03, volume 16, 2003.
[49] X. Yin, J. Han, and P. Yu. Cross-relational clustering with user's guidance. In KDD-2005, 2005.
[50] X. Yin, J. Han, and P. Yu. Linkclus: Efficient clustering via heterogeneous semantic links. In *VLDB*-2006, 2006.
[51] H.-J. Zeng, Z. Chen, and W.-Y. Ma. A unified framework for clustering heterogeneous web objects. In *WISE* '02, pages 161-172, 2002.

What is claimed is:

1. A method of relational analysis of data, comprising:
receiving a data set comprising a plurality of interrelated data objects having at least one type of data associated with different latent classes, having at least one of respective data object attributes, homogeneous relations between the respective data object and data objects having the same type, and heterogeneous relations between the respective data object and data objects having different types;
providing an unsupervised mixed membership relational clustering model for determining a clustering of the plurality of data objects, based on at least respective relationships with other data objects dependent on the different latent classes;
generating latent indicators for the plurality of data objects, comprising respective latent class membership parameters based on a predetermined distribution, wherein the latent indicators have respective latent class membership parameters generated based on a distribution selected from the group consisting of: a multinomial distribution; a Bernoulli distribution; a normal distribution; and an exponential distribution;
automatically optimizing the mixed membership relational clustering model by maximizing a likelihood function to estimate unknown parameters of a joint probability distribution matrix over the latent indicators of the plurality of data objects, and observations of the data object attributes;
using the optimized mixed membership relational clustering model to partition an arbitrarily complex graph involving at least the data object attributes, the homogeneous relations and the heterogeneous relations; and
representing in a memory the partitioned graph.

2. The method according to claim 1, wherein said received data set comprises a comprising plurality of different interrelated types of data associated with respectively different latent classes, having respective data object attributes, homogeneous relations between the respective data object and data objects having the same type, and heterogeneous relations between the respective data object and data objects having different types.

3. The method according to claim 1, wherein the latent indicators have respective latent class membership parameters generated based on a multinomial distribution.

4. The method according to claim 1, wherein the latent indicators have respective latent class membership parameters generated based on a Bernoulli distribution.

5. The method according to claim 1, wherein the latent indicators have respective latent class membership parameters generated based on a normal distribution.

6. The method according to claim 1, wherein the latent indicators have respective latent class membership parameters generated based on an exponential distribution.

7. The method according to claim 1, wherein the likelihood function is maximized using a posterior computed using the Gibbs sampler.

8. The method according to claim 1, wherein:
the data set is represented as $\{\{F^{(j)}\}_{j=1}^m, \{S^{(j)}\}_{j=1}^m, \{R^{(ij)}\}_{i,j=1}^m\}$;
attributes of respective data objects are represented as $\{\Theta^{(j)}\}_{j=1}^m$;
the homogeneous relations are represented as $\{\Gamma^{(j)}\}_{j=1}^m$;
the heterogeneous relations are represented as $\{Y^{(ij)}\}_{i,j=1}^m$;
the mixed membership model is represented as $\{\Lambda^{(j)}\}_{j=1}^m$;
the latent indicators are represented as $\{C^{(j)}\}_{j=1}^m$;
wherein the likelihood function is represented by $\tilde{\Omega} = \{\{\tilde{\Lambda}^{(j)}\}_{j=1}^m, \{\tilde{\Theta}^{(j)}\}_{j=1}^m, \{\tilde{\Gamma}^{(j)}\}_{j=1}^m, \{\tilde{Y}^{(ij)}\}_{i,j=1}^m$, which is initialized and the posterior $Pr(\{C^{(j)}\}|F^{(j)}\}_{j=1}^m, \{S^{(j)}\}_{j=1}^m, \{R^{(ij)}\}_{i,j=1}^m, \tilde{\Omega})$ computed using the Gibbs sampler.

9. The method according to claim 8, wherein the likelihood function is maximized by iteratively updating $\tilde{\Omega} = \Omega$ over the range of i and j, until convergence is achieved, with update rules:

$$\Lambda_{hp}^{(1)} = PR(C_{hp}^{(1)} = 1 | F, S, R, \tilde{\Omega}),$$

$$\Theta_{\cdot g} = \frac{\sum_{p=1}^{n_1} F_{\cdot p} Pr(C_{gp}^{(1)} = 1 | F, S, R, \tilde{\Omega})}{\sum_{p=1}^{n_1} Pr(C_{gp}^{(1)} = 1 | F, S, R, \tilde{\Omega})}$$

$$\Gamma_{gh} = \frac{\sum_{p,q=1}^{n_1} S_{pq} Pr(C_{gp}^{(1)} = 1, C_{hq}^{(1)} = 1 | F, S, R, \tilde{\Omega})}{\sum_{p,q=1}^{n_1} Pr(C_{gp}^{(1)} = 1, C_{hq}^{(1)} = 1 | F, S, R, \tilde{\Omega})},$$

to estimate unknown parameters of a joint probability distribution equation over the observations and latent indicators.

10. The method according to claim 8, wherein the likelihood function is maximized by iteratively updating $\tilde{\Omega} = \Omega$ over the range of i and j, until convergence is achieved, with update rules:

update $\{C^{(1)}\}_{j=1}^{m}$, to maximize the objective function $$\log L\,(\Omega\,|\,\Psi) = \sum_{p=1}^{n_1}\sum_{g=1}^{k_1} C_{gp}^{(1)}\log\Lambda_{gp}^{(1)} + \sum_{q=1}^{n_1}\sum_{h=1}^{k_2} C_{hq}^{(2)}\log\Lambda_{gp}^{(2)},$$

$$-D_{\phi_1}(F,\Theta C^{(1)}) - D_{\phi_2}(S,(C^{(1)})^T\Gamma C^{(1)}) - D_{\phi_3}(R,C^{(1)})^T Y C^{(2)} + \tau$$

wherein $$\Theta_{\cdot g}^{(j)} = \frac{\sum_{p:C_{gp}^{(j)}=1} F_{\cdot p}^{(j)}}{\sum_{p=1}^{n_j} C_{gp}^{(j)}},$$

$$\Gamma_{gh}^{(j)} = \frac{\sum_{p:C_{gp}^{(j)}=1,q:C_{hq}^{(j)}=1} S_{pq}^{(j)}}{\sum_{p=1}^{n_j} C_{gp}^{(j)} \sum_{q=1}^{n_j} C_{hq}^{(j)}},$$

$$\Upsilon_{gh}^{(ij)} = \frac{\sum_{p:C_{gp}^{(i)}=1,q:C_{hq}^{(j)}=1} R_{pq}^{(ij)}}{\sum_{p=1}^{n_i} C_{gp}^{(i)} \sum_{q=1}^{n_j} C_{hq}^{(j)}},$$

$\Psi = \{\{C^{(j)}\}_{j=1}^{m}, \{F^{(j)}\}_{j=1}^{m}, \{R^{(ij)}\}_{i,j=1}^{m}\}$,
$\tau = \log f_{\phi_1}(F) + \log f_{\phi_2}(S) + \log f_{\phi_3}(R)$,
$D_{\phi_1}$ is a Bregman divergence for the attributes,
$D_{\phi_2}$ is a Bregman divergence for the homogeneous relations,
$D_{\phi_3}$ is a Bregman divergence for heterogeneous relations, and
$f_{\phi_n}$ represents a uniquely determined function for each respective exponential family distribution;
to estimate unknown parameters of a joint probability distribution equation over the observations and latent indicators.

11. A system for unsupervised relational clustering of data, adapted to receive a data set comprising a plurality of interrelated data objects having data associated with latent classes, having at least one of respective data object attributes, homogeneous relations between the data objects having the same type, and heterogeneous relations between the data objects having different types, and to cluster the data objects, comprising:
a memory configured to store the received data set and the at least one of respective data object attributes, homogeneous relations between the data objects having the same type, and heterogeneous relations between the data objects having different types, and to cluster the data objects;
a memory configured to store parameters of an unsupervised mixed membership relational clustering model, based on the different latent classes, respective data object attributes, available homogeneous relations between the data objects having the same type, and available heterogeneous relations between the data objects having different types; and
at least one automated processor configured to:
generate latent indicators for the plurality of data objects, comprising respective latent class membership parameters based on a predetermined distribution, wherein the latent indicators have respective latent class membership parameters generated based on a distribution selected from the group consisting of: a multinomial distribution; a Bernoulli distribution; a normal distribution; and an exponential distribution;
automatically optimize the mixed membership relational clustering model by updating the parameters to maximize a likelihood function to estimate unknown parameters of a joint probability distribution matrix over the latent indicators of the plurality of data objects with respect to:
observations of the data object attributes,
the homogeneous relations between the respective data object and data objects having the same type if available, and
the heterogeneous relations between the respective data object and data objects having different types if available,
use the optimized mixed membership relational clustering model to partition an arbitrarily complex graph involving at least the data object attributes, the homogeneous relations and the heterogeneous relations;
produce an output representing the partitioned graph.

12. The system according to claim 11, wherein the data set comprises a plurality of different interrelated types of data associated with respectively different latent classes, having respective data object attributes, homogeneous relations between the respective data object and data objects having the same type, and heterogeneous relations between the respective data object and data objects having different types.

13. The system according to claim 11, wherein the likelihood function is maximized using a posterior computed using the Gibbs sampler.

14. The system according to claim 11, wherein:
the data set is represented as $\{\{F^{(j)}\}_{j=1}^{m},\{S^{(j)}\}_{j=1}^{m},\{R^{(ij)}\}_{i,j=1}^{m}\}$;
attributes of respective data objects are represented as $\{\Theta^{(j)}\}_{j=1}^{m}$;
the homogeneous relations are represented as $\{\Gamma^{(j)}\}_{j=1}^{m}$;
the heterogeneous relations are represented as $\{\Upsilon^{(ij)}\}_{i,j=1}^{m}$;
the mixed membership model is represented as $\{\Lambda^{(j)}\}_{j=1}^{m}$;
the latent indicators are represented as $\{C^{(j)}\}_{j=1}^{m}$;
wherein the likelihood function is represented by $$\tilde{\Omega} = \{\{\tilde{\Lambda}^{(j)}\}_{j=1}^{m},\{\tilde{\Theta}^{(j)}\}_{j=1}^{m},\{\tilde{\Gamma}^{(j)}\}_{j=1}^{m},\{\tilde{\Upsilon}^{(ij)}\}_{i,j=1}^{m},$$

wherein the at least one automated processor is further configured to:
initialize the likelihood function, and
compute the posterior $\Pr(\{C^{(j)}\}|F^{(j)}\}_{j=1}^{m},\{S^{(j)}\}_{j=1}^{m},\{R^{(ij)}\}_{i,j=1}^{m},\tilde{\Omega})$ using the Gibbs sampler.

15. The system according to claim 11, wherein the at least one automated processor is further configured to maximize the likelihood function by iteratively updating $\tilde{\Omega} = \Omega$ over the range of i and j, until convergence is achieved, to estimate unknown parameters of a joint probability distribution equation over the observations and latent indicators, with update rules selected from the group consisting of update rule set (I) and update rule set (II):

update rule set (I)
$\Lambda_{hp}^{(1)} = PR(C_{hp}^{(1)} = 1 | F, S, R, \tilde{\Omega})$, $$\Theta_{\cdot g} = \frac{\sum_{p=1}^{n_1} F_{\cdot p} Pr(C_{gp}^{(1)} = 1 | F, S, R, \tilde{\Omega})}{\sum_{p=1}^{n_1} Pr(C_{gp}^{(1)} = 1 | F, S, R, \tilde{\Omega})}$$

$$\Gamma_{gh} = \frac{\sum_{p,q=1}^{n_1} S_{pq} Pr(C_{gp}^{(1)} = 1, C_{hq}^{(1)} = 1 | F, S, R, \tilde{\Omega})}{\sum_{p,q=1}^{n_1} Pr(C_{gp}^{(1)} = 1, C_{hq}^{(1)} = 1 | F, S, R, \tilde{\Omega})},$$

update rule set (II)
update $\{C^{(j)}\}_{j=1}^{m}$, to maximize the objective function $$\log L(\Omega | \Psi) = \sum_{p=1}^{n_1} \sum_{g=1}^{k_1} C_{gp}^{(1)} \log \Lambda_{gp}^{(1)} + \sum_{q=1}^{n_2} \sum_{h=1}^{k_2} C_{hq}^{(2)} \log \Lambda_{gp}^{(2)},$$

$$-D_{\phi_1}(F, \Theta C^{(1)}) - D_{\phi_2}(S, (C^{(1)})^T \Gamma C^{(1)}) - D_{\phi_3}(R, C^{(1)})^T \Upsilon C^{(2)} + \tau$$

wherein $$\Theta_g^{(j)} = \frac{\sum_{p: C_{gp}^{(j)}=1} F_{\cdot p}^{(j)}}{\sum_{p=1}^{n_j} C_{gp}^{(j)}},$$

$$\Gamma_{gh}^{(j)} = \frac{\sum_{p: C_{gp}^{(j)}=1, q: C_{hq}^{(j)}=1} S_{pq}^{(j)}}{\sum_{p=1}^{n_j} C_{gp}^{(j)} \sum_{q=1}^{n_j} C_{hq}^{(j)}},$$

$$\Upsilon_{gh}^{(ij)} = \frac{\sum_{p: C_{gp}^{(j)}=1, q: C_{hq}^{(j)}=1} R_{pq}^{(ij)}}{\sum_{p=1}^{n_i} C_{gp}^{(i)} \sum_{q=1}^{n_j} C_{hq}^{(j)}},$$

$\Psi = \{\{C^{(j)}\}_{j=1}^{m}, \{F^{(j)}\}_{j=1}^{m}, \{R^{(ij)}\}_{i,j=1}^{m}\}$,
$\tau = \log f_{\phi_1}(F) + \log f_{\phi_2}(S) + \log f_{\phi_3}(R)$,
$D_{\phi_1}$ is a Bregman divergence for the attributes,
$D_{\phi_2}$ is a Bregman divergence for the homogeneous relations,
$D_{\phi_3}$ is a Bregman divergence for heterogeneous relations, and
$f_{\phi_n}$ represents a uniquely determined function for each respective exponential family distribution.

16. A method for relational analysis of data, comprising:
(a) receiving a data set comprising a plurality of interrelated data objects each having at least one type of data associated with a plurality of latent classes, and having at least one of respective data object attributes, homogeneous relations between the respective data object and data objects having the same type, and heterogeneous relations between the respective data object and data objects having different types;
(b) generating latent indicators for the plurality of interrelated data objects, comprising respective latent class membership parameters, based on at least the respective data object attributes, available homogeneous relations between the respective data object and data objects having the same type, and available heterogeneous relations between the respective data object and data objects having different types, wherein the latent indicators have respective latent class membership parameters generated based on a distribution selected from the group consisting of: a multinomial distribution; a Bernoulli distribution; a normal distribution; and an exponential distribution;
(c) optimizing a probabilistic function comprising a mixed membership relational clustering model which estimates a joint probability distribution over the generated latent indicators of the data set and observations of the respective data object attributes;
(d) clustering the data set with at least one automated processor, using the optimized probabilistic function, based on at least the data object attributes, the homogeneous relations and the heterogeneous relations; and
(d) storing information representing the clustering of the plurality of the data set.

17. The method according to claim 16, wherein said optimizing comprises initializing the probabilistic function and computing a posterior function:

$Pr(\{C^{(j)}\}|F^{(j)}\}_{j=1}^{m}, \{S^{(j)}\}_{j=1}^{m}, \{R^{(ij)}\}_{i,j=1}^{m}, \tilde{\Omega})$, wherein:
the input data set represented as a set of exponential family distributions $\{\{F^{(j)}\}_{j=1}^{m}, \{S^{(j)}\}_{j=1}^{m}, \{R^{(ij)}\}_{i,j=1}^{m}\}$;
the initial estimate of a set of matrices is $\tilde{\Omega}$
the membership matrices are $\{\Lambda^{(j)}\}_{j=1}^{m}$,
the attribute matrices are $F^{(j)}$,
the attribute expectation matrices are $\{\Theta^{(j)}\}_{j=1}^{m}$
the homogeneous relation matrices are $S^{(j)}$
the homogeneous relation expectation matrices are $\{\Gamma^{(j)}\}_{j=1}^{m}$,
the heterogeneous relation matrices are $R^{(ij)}$,
the heterogeneous relation expectation matrices are $\{\Upsilon^{(ij)}\}_{i,j=1}^{m}$
$C^{(j)}$ is a cluster indicator matrix,
$\Lambda^{(j)}$ is computed using $\Lambda_{hp}^{(1)} = Pr(C_{hp}^{(1)} = 1 | F, S, R, \tilde{\Omega})$, $\Theta^{(j)}$ is computed using $\Theta_{\cdot g} = \dfrac{\sum_{p=1}^{n_1} F_{\cdot p} Pr(C_{gp}^{(1)} = 1 | F, S, R, \tilde{\Omega})}{\sum_{p=1}^{n_1} Pr(C_{gp}^{(1)} = 1 | F, S, R, \tilde{\Omega})}$, $\Gamma^{(j)}$ is computed using $\Gamma_{gh} = \dfrac{\sum_{p,q=1}^{n_1} S_{pq} Pr(C_{gp}^{(1)} = 1, C_{hq}^{(1)} = 1 \mid F, S, R, \tilde{\Omega})}{\sum_{p,q=1}^{n_1} Pr(C_{gp}^{(1)} = 1, C_{hq}^{(1)} = 1 \mid F, S, R, \tilde{\Omega})},$ $\Upsilon^{(ij)}$ is computed using $\Upsilon_{gh} =$ $$\dfrac{\sum_{p=1}^{n_1}\sum_{q=1}^{n_2} R_{pq} Pr(C_{gp}^{(1)} = 1, C_{hq}^{(2)} = 1 \mid F, S, R, \tilde{\Omega})}{\sum_{p=1}^{n_1}\sum_{q=1}^{n_2} Pr(C_{gp}^{(1)} = 1, C_{hq}^{(2)} = 1 \mid F, S, R, \tilde{\Omega})};$$

and
wherein the probabilistic function is maximized by iteratively updating $\tilde{\Omega} = \Omega$ over the range of i and j, until convergence is achieved.

18. The method according to claim 16, wherein the probabilistic function is maximized using a posterior computed using the Gibbs sampler.

19. The method according to claim 16, wherein:
the data set is represented as $\{\{F^{(j)}\}_{j=1}^{m}, \{S^{(j)}\}_{j=1}^{m}, \{R^{(ij)}\}_{i,j=1}^{m}\}$;
attributes of respective data objects are represented as $\{\Theta^{(j)}\}_{j=1}^{m}$;
the homogeneous relations are represented as $\{\Gamma^{(j)}\}_{j=1}^{m}$;
the heterogeneous relations are represented as $\{\Upsilon^{(ij)}\}_{i,j=1}^{m}$;
the mixed membership model is represented as $\{\Lambda^{(j)}\}_{j=1}^{m}$;
the latent indicators are represented as $\{C^{(j)}\}_{j=1}^{m}$;
wherein the probabilistic function is represented by $\tilde{\Omega} = \{\{\tilde{\Lambda}^{(j)}\}_{j=1}^{m}, \{\tilde{\Theta}^{(j)}\}_{j=1}^{m}, \{\tilde{\Gamma}^{(j)}\}_{j=1}^{m}, \{\tilde{\Upsilon}^{(ij)}\}_{i,j=1}^{m},$ the method further comprising:
initializing the probabilistic function; and
computing the posterior $Pr(\{C^{(j)}\} \mid \{F^{(j)}\}_{j=1}^{m}, \{S^{(j)}\}_{j=1}^{m}, \{R^{(ij)}\}_{i,j=1}^{m}, \tilde{\Omega})$ using the Gibbs sampler.

20. The method according to claim 16, further comprising maximizing the probabilistic function by iteratively updating $\tilde{\Omega} = \Omega$ over the range of i and j, until convergence is achieved, to estimate unknown parameters of a joint probability distribution equation over the observations and latent indicators, with update rules selected from the group consisting of update rule set (I) and update rule set (II):
update rule set (I)
$\Lambda_{hp}^{(1)} = PR(C_{hp}^{(1)} = 1 \mid F, S, R, \tilde{\Omega}),$ $\Theta_{\cdot g} = \dfrac{\sum_{p=1}^{n_1} F_{\cdot p} Pr(C_{gp}^{(1)} = 1, \mid F, S, R, \tilde{\Omega})}{\sum_{p=1}^{n_1} Pr(C_{gp}^{(1)} = 1, \mid F, S, R, \tilde{\Omega})}$ $\Gamma_{gh} = \dfrac{\sum_{p,q=1}^{n_1} S_{pq} Pr(C_{gp}^{(1)} = 1, C_{hq}^{(1)} = 1 \mid F, S, R, \tilde{\Omega})}{\sum_{p,q=1}^{n_1} Pr(C_{gp}^{(1)} = 1, C_{hq}^{(1)} = 1 \mid F, S, R, \tilde{\Omega})},$ update rule set (II)
update $\{C^{(j)}\}_{j=1}^{m}$, to maximize the objective function $$\log L(\Omega \mid \Psi) = \sum_{p=1}^{n_1}\sum_{g=1}^{k_1} C_{gp}^{(1)} \log \Lambda_{gp}^{(1)} + \sum_{q=1}^{n_2}\sum_{h=1}^{k_2} C_{hq}^{(2)} \log \Lambda_{gp}^{(2)},$$

$-D_{\phi_1}(F, \Theta C^{(1)}) - D_{\phi_2}(S, (C^{(1)})^T \Gamma C^{(1)}) - D_{\phi_3}(R, C^{(1)})^T \Upsilon C^{(2)} + \tau$ wherein $$\Theta_{\cdot g}^{(j)} = \dfrac{\sum_{p : C_{gp}^{(j)}=1} F_{\cdot p}^{(j)}}{\sum_{p=1}^{n_j} C_{gp}^{(j)}},$$

$$\Gamma_{gh}^{(j)} = \dfrac{\sum_{p : C_{gp}^{(j)}=1, q : C_{hq}^{(j)}=1} S_{pq}^{(j)}}{\sum_{p=1}^{n_j} C_{gp}^{(j)} \sum_{q=1}^{n_j} C_{hq}^{(j)}},$$

$$\Upsilon_{gh}^{(ij)} = \dfrac{\sum_{p : C_{gp}^{(i)}=1, q : C_{hq}^{(j)}=1} R_{pq}^{(ij)}}{\sum_{p=1}^{n_i} C_{gp}^{(i)} \sum_{q=1}^{n_j} C_{hq}^{(j)}},$$

$\Psi = \{\{C^{(j)}\}_{j=1}^{m}, \{F^{(j)}\}_{j=1}^{m}, \{R^{(ij)}\}_{i,j=1}^{m}\},$
$\tau = \log f_{\phi_1}(F) + \log f_{\phi_2}(S) + \log f_{\phi_3}(R),$
$D_{\phi_1}$ is a Bregman divergence for the attributes,
$D_{\phi_2}$ is a Bregman divergence for the homogeneous relations,
$D_{\phi_3}$ is a Bregman divergence for heterogeneous relations, and
$f_{\phi_n}$ represents a uniquely determined function for each respective exponential family distribution.

\* \* \* \* \*